April 23, 1968  J. T. STEWART, JR  3,379,410

VALVE HAVING SEAT SEAL AND VENTING MEANS

Filed March 11, 1965  2 Sheets-Sheet 1

INVENTOR.
JOSEPH T. STEWART, JR.
BY
James L. Jackson
AGENT

April 23, 1968  J. T. STEWART, JR  3,379,410
VALVE HAVING SEAT SEAL AND VENTING MEANS
Filed March 11, 1965  2 Sheets-Sheet 2
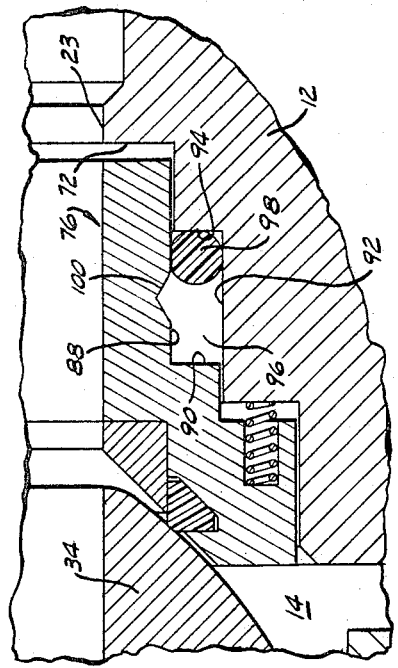
FIG. 3.
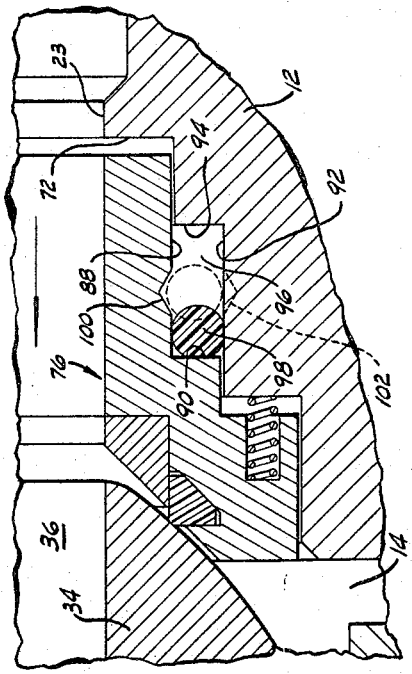
FIG. 4.
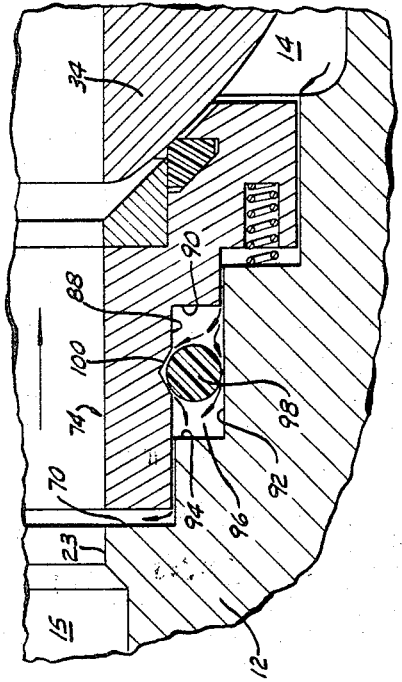
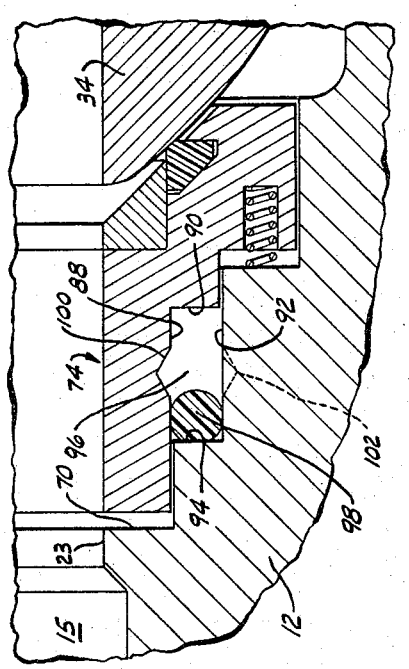
INVENTOR.
JOSEPH T. STEWART, JR.
BY
*James L. Jackson*
AGENT

United States Patent Office 3,379,410
Patented Apr. 23, 1968

3,379,410
VALVE HAVING SEAT SEAL AND
VENTING MEANS
Joseph T. Stewart, Jr., Houston, Tex., assignor to ACF Industries, Incorporated, New York, N.Y., a corporation of New Jersey
Filed Mar. 11, 1965, Ser. No. 438,999
9 Claims. (Cl. 251—359)

ABSTRACT OF THE DISCLOSURE

A pressure relieving seat construction for valves including movable seat assemblies and having parts of the seat assemblies arranged to vent body pressure into the upstream line in the event body pressure becomes higher than line pressure.

This invention relates generally to valves and more particularly to seat assembly constructions for valves which serve effectively as upstream or downstream sealing and which prevent seizing or locking of the valve member within the valve by the pressurized fluid controlled by the valve.

In most valves, spherical plug valves and gate valves for example, under certain conditions of operation there exists a fluid pressure within the valve body which is higher than the fluid pressure within the flow passages of the valve. While this condition can be considered normal under certain operating conditions, it may under other conditions be considered abnormal and may even become dangerous. A condition where the body pressure is higher than the line pressure may cause the valve member to seize within the valve, thereby preventing movement of the valve between open and closed positions, and under certain conditions may even cause rupture of the valve body, thereby destroying the valve.

Assuming hypothetically that a valve is open and under no line pressure, and that the valve body of the valve is under no pressure when the flow of fluid is introduced through the line in which the valve is located, there would exist a condition where the valve body would remain under little or no line pressure and the flow of pressurized fluid will be conducted through the valve. If the valve, while under pressure, is subsequently moved between open and closed positions, the flow passage through the valve member will communicate the valve body with the line, allowing the pressurized fluid within the line to flow into the valve body, thereby increasing the valve body pressure to an amount equal to line pressure. If the valve is then moved back to its open position with the valve body and line pressure equal, and then line pressure reduced to substantially zero, for example by shutting down the line, the upstream and downstream sealing members between the valve member and the valve body will tend to maintain the seal with the valve member and retain the pressure within the valve body, even though the pressure within the line has diminished. The pressurized fluid within the valve body will have become trapped by the upstream and downstream sealing members with no means of escape until the valve member is moved between open and closed positions, thereby allowing communication between the valve body and the flow passages of the valve to allow venting of the trapped pressurized fluid. These operating conditions are generally termed "normal," since most reversible valves are subject to the above conditions of operation.

Abnormal pressure conditions, such as an increase in valve body pressure over the pressure within the flow passages of the valve, can occur if the fluid trapped within the valve body should expand due to heat, for example by ambient temperatures or by heat from fire, etc. Valve body pressure in excess of line pressure will cause the face sealing members of the valve to more tightly engage the movable valve member, thereby resulting in increased torque required for movement of the valve member between open and closed positions. Frequently under this condition the torque requirement for moving the valve member will become higher than the torque forces which can be produced by manual or power operated equipment, and it will be impossible to move the valve member. This condition is known as "pressure lock" in the valve industry. Valves which have become "pressure locked" may be put back into serviceable condition if the valve has been fitted with a body bleed fitting, allowing the bleeding of the excess pressure within the valve body to the atmosphere or the valve may be dismantled or partially dismantled to relieve the body pressure. Frequently, however, valves which have become "pressure locked" may be damaged by the excessive pressure to the extent that extensive repair or replacement is necessary. Assuming that "pressure locking" occurs from expansion of the liquid within the valve body by heat produced by ambient temperature or by fire, it is possible for the pressure within the valve body to increase to such an extent that the valve body could become ruptured, thereby destroying the valve. This is an extremely dangerous condition because portions of the valve body could be forcibly ejected from the valve in such a manner as to become dangerous for any personnel in the immediate area. Valve damage or destruction, therefore, may occur both in low pressure and high pressure valve applications and may occur without warning to operating personnel. If pressure locking occurs it could result in shutting down the line for valve repairs which obviously would involve considerable needless production losses and repair costs.

Accordingly, it is a primary object of this invention to provide a novel seat assembly structure for a valve, which will effectively vent gradually increasing body pressure into the upstream line.

It is a further object of this invention to provide a novel seat assembly structure for valves which are adapted for reversible operation, thereby allowing venting of excessive pressure from the valve body regardless of the direction of fluid flow.

It is a further object of this invention to provide a novel seat structure for valves which allows the seal to be maintained between the valve member and the seat assembly of the valve during the venting of gradually increasing body pressure to the upstream line.

Briefly, the invention comprises a valve having a valve body and a movable valve member disposed within the valve body and adapted for movement between open and closed positions for controlling the flow of fluid through the valve. The valve is provided with a pair of seat recesses which may be oppositely disposed with respect to the valve member, and which contain seat assemblies for sealing engagement with the valve member. Each of the seat assemblies is provided with a sealing portion thereof which is normally disposed in fluidtight sealing engagement with the valve member. Each of the seat assemblies is associated with the seat recess in such a manner as to define an annular chamber between the seat assembly and the valve body. At least one wall defining the annular chamber is provided with a depression intermediate the ends of the annular chamber. An O-ring type resilient sealing member is disposed within each of the annular chambers and cooperates with the depression or depressions to allow the flow of fluid from the valve body to the upstream line if the valve body pressure should exceed line pressure. As the pressure within the valve body is increased gradually to a level above the pressure within the line, for example by expansion of the fluid within the valve body by ambient temperature or by heat from fire or the like, the upstream O-ring type sealing member will move from an initial position downstream of the depression into juxtaposed relation with the depression structure, allowing the flow of fluid between the O-ring sealing member and the seal chamber wall from the valve body to the upstream line. The back seal construction of the present seat assemblies effectively prevents the build up of pressure within the valve body which would otherwise cause pressure locking of the valve or destruction of the valve itself.

Other and further objects of the invention will become obvious upon an understanding of the illustrative embodiments about to be described, or will be indicated in the appended claims and various advantages not referred to herein will occur to one skilled in the art upon employment of the invention in practice.

Various other objects of the present invention will become apparent upon an understanding of the following description taken in conjunction with the accompanying drawings in which;

FIGURES 2 and 3 are fragmentary sectional views of the valve of FIGURE 1, illustrating the seat structure and operation thereof in greater detail.

FIGURE 4 is a fragmentary sectional view of the valve of FIGURE 1, illustrating the seat structure and the operation thereof in greater detail and in addition illustrating a modified embodiment of the present invention.

Figure 1:
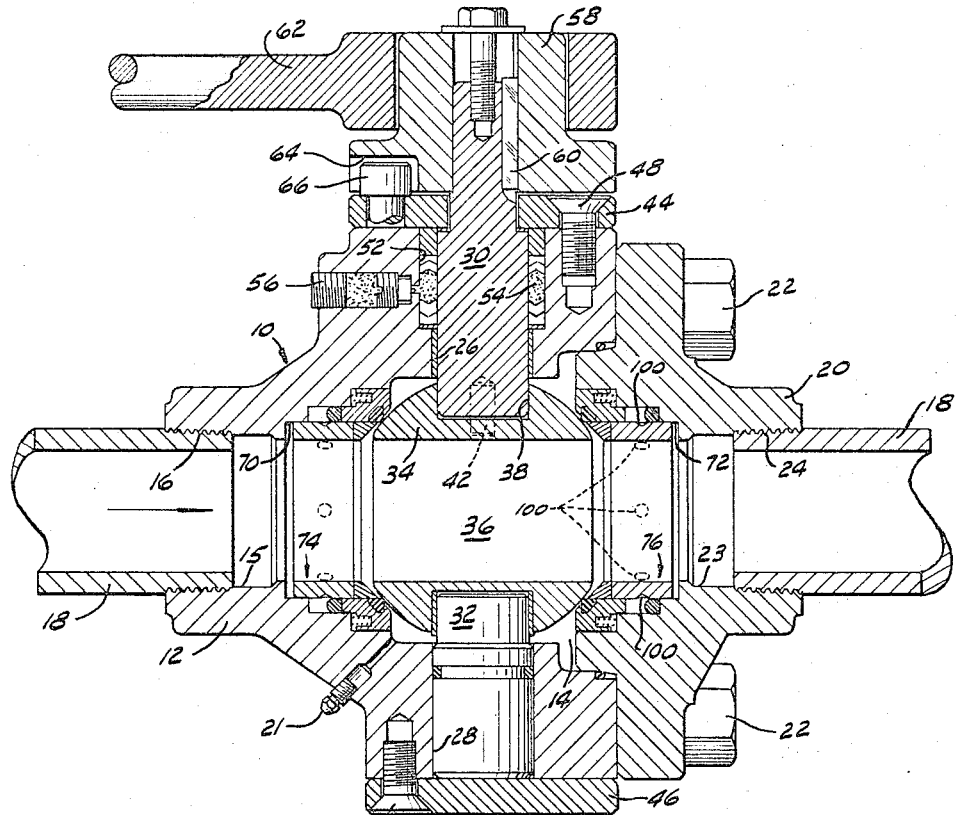
FIGURE 1 is an elevational view in section, illustrating a spherical plug valve constructed in accordance with the principles of the present invention.

Referring now to the drawings for a more complete understanding of this invention, a valve, which may be an end entry spherical plug valve as illustrated generally at 10 in FIGURE 1, has a valve body portion 12 thereof, defining a valve chamber 14. The body portion 12 of the valve 10 is formed with a flow passage 15 in fluid communication with the valve chamber which may be provided with internal threads, as shown at 16 in FIGURE 1, for threaded connection of the valve body to a pipeline 18. The valve body might also be provided with flanged or welded connection structure without departing from the spirit or scope of this invention. An end closure portion 20 of the valve 10 is retained in sealed assembly with the valve body portion 12 by a series of bolts or threaded studs 22 and defines a closure for the valve chamber. The end closure member 20 is formed with a flow passage 23 which may be internally threaded, as illustrated at 24 in FIGURE 1, for threaded connection of the closure member to a pipeline 18. The end closure member might also be provided with other conventional connection structure such as welded or flanged connection structure, for example, without departing from the spirit or scope of this invention. The valve body may be provided with a pressure relief fitting 21 for bleeding body pressure to the atmosphere for "block and bleed" testing as will be discussed in detail hereinbelow.

The valve body 12 is formed with aligned upper and lower bores 26 and 28 respectively, which receive upper and lower trunnion members 30 and 32 respectively therein. A spherical plug member 34, having a flow passage 36 formed therein, is rotatably positioned within the valve chamber 14, and is provided with oppositely disposed generally cylindrical bores 38 and 40, which receive the inner extremities of the trunnions 30 and 32. The plug member 34 is mounted for rotation upon the lower trunnion member 32 and is maintained in nonrotatable relation with the upper trunnion 30 by a pair of pin members 42, which fit within mating bores formed in the plug and in the trunnion 30. Upper and lower cap plates 44 and 46 are fixed to the valve body 12 by a series of bolts 48 and 50 respectively, and serve as axial thrust supports for the upper and lower trunnions 30 and 32.

An enlarged bore 52, formed in concentric relation with the bore 26 in the valve body 12, cooperates with the cylindrical surface of the upper trunnion member 30 to define an annular packing chamber having a packing assembly 54 disposed therein for the establishment of a fluidtight seal between the trunnion 30 and the valve body 12. A packing adjustment structure 56 is formed within the valve body 12 and is adapted for manual adjustment for forcing semisolid packing material, which might be in the form of a plastic or a heavy grease, into the packing chamber to repressurize the packing assembly 54, if leakage should occur along the valve stem by wear. To the upper extremity of the upper trunnion 30 is nonrotatably fixed a stem nut 58 by a key 60 or the like, and the upper portion of the stem nut 58 is adapted to receive a handle member 62 or other suitable manual or power operator structure for imparting movement of the plug member 34 between open and closed positions. The stem nut 58 is provided adjacent its lower portion with an arcuate groove 64, which cooperates with the head of a stud or nut 66 to limit rotation of the plug member 34 to an angle of substantially 90°.

Figure 2:
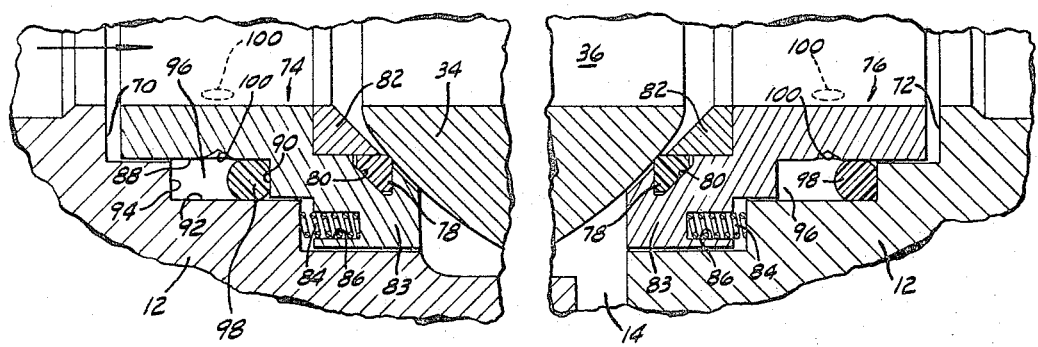

As illustrated in FIGURES 2, 3, and 4, and forming an important part of this invention, the valve body 12 of the valve 10 is formed with a pair of seat recesses 70 and 72, each having seat assembly structures 74 and 76 respectively positioned therein. As shown in the drawings, each of the seat assemblies 74 and 76 is generally identical and includes a face sealing member 78, which is retained within an annular seal groove 80 by cooperation of an annular retainer member 82 with a seat member 83. A series of spring members 84 is disposed within a series of bores 86, formed in a seat member 83, and serves to bias entire seat assembly 74–76 into engagement wit hthe valve member 34, thereby forcing the sealing member 78 of the seat assembly into light sealing engagement with the spherical surface of the plug 34. The specific face sealing structure of the seat assemblies illustrated and described is intended as illustrative rather than limiting with respect to this invention, however. Any of a number of satisfactory face sealing structures might be successfully incorporated into the seat assemblies without departing from the spirit or scope of this invention.

Each of the seat assemblies 74 and 76 is provided with a generally cylindrical surface 88, and a generally planar annular radial surface 90, which cooperates with substantially cylindrical and radial surfaces 92 and 94 respectively, formed in the valve body and defining a portion of the seat recess 70 and 72, to define an annular back seal chamber 96. The back seal chamber 96 is of considerably greater axial length than the radial dimension thereof, and is adapted to retain an O-ring type resilient back sealing member 98 therein, for the establishment of a fluidtight seal between the cylindrical surfaces 88 and 92 of the seat assembly and valve body respectively. The resilient O-ring type back sealing member 98, referred to hereinafter as the O-ring 98, is of slightly greater cross-sectional diameter than the radial dimension of the back seal chamber 96, thereby causing the O-ring 98 to be slightly compressed between the cylindrical surfaces 88 and 92, thereby establishing an initial compression seal between the seat assemblies and the valve body.

As illustrated in FIGURES 2 and 3, the cylindrical surface 88 of each of the seat assemblies is formed with a depression 100 or a series of depressions 100 equally spaced about the periphery of the cylindrical surface 88. When the seat assemblies 74 and 76 are disposed within the seat recesses 70 and 72 respectively, thereby defining the annular O-ring retaining chamber 96, the depressions 100 will be located intermediate the ends of the chamber 96.

"Pressure actuation" is a term generally referred to in the valve industry as movement of seat assemblies of the valve into sealing engagement with the valve member by virtue of a force differential applied to the seat assemblies by the pressurized fluid which is controlled by the valve. A greater rear area than face area of the seat assembly is contacted by the pressurized fluid, thereby establishing the force differential and causing pistonlike movement of the seat assembly into intimate engagement with the valve member. Movement of the seat assemblies of the valve illustrated and disclosed in this application by the pressurized fluid will be referred to hereinafter as "pressure actuation."

As illustrated in FIGURES 1 and 2, the direction of flow of the fluid through the valve 10 is from left to right and each of the O-rings 98, as illustrated in greater detail in FIGURE 2, will be positioned downstream from the depressions 100 and in abutment with the downstream wall of the annular chamber 96, to establish a fluidtight seal between the seat assemblies 74–76 and the valve body 12. Fluid under pressure within the valve chamber 14 will attempt to bypass the O-ring to escape into the downstream line by flowing through the clearances between the seat assembly and the valve body. This fluid, however, will maintain the downstream O-ring 98 in abutment with the downstream radial wall 90 of the downstream (right) chamber 96. In moving to the FIGURE 2 position, the downstream O-ring 98 will be moved across the depression 100 by pressure from the valve chamber 14 which enters the annular chamber 96 through the clearance between the seat assemblies and the seat recess. During this movement a small amount of fluid will flow past the O-ring 98 into the downstream line since the seal between the cylindrical walls 88 and 92 will become broken for a short interval of time as the O-ring is moved across the depression. The amount of force produced upon the seal ring 98 by the pressurized fluid under these conditions, however, will cause the downstream sealing member 98 to move very rapidly past the depression structure 100, thereby immediately reestablishing the seal between the cylindrical surfaces 88 and 92.

The seat assemblies 74 and 76 of the valve, as illustrated in the drawings, will be subject to concurrent pressure actuation to establish upstream and downstream seals even in the open position of the valve. Fluid under line pressure, because of the force differential, will move the upstream seat 74 in a downstream direction and will establish a seal between the seat assembly 74 and the valve member 34. The downstream seat 76 will also be pressure actuated by virtue of force differential into intimate sealing engagement with the valve member 34. Fluid under pressure enters the chamber 96 through the clearance between the seat assembly 76 and the seat recess 72 and develops a force at the rear of the seat assembly which is higher than the force applied at the face of the seat assembly by virtue of the difference in area exposed to the pressurized fluid from the valve chamber 14. The valve will continue to function, therefore, if one of the sealing members 78 becomes worn or damaged.

If the valve of FIGURES 1 and 2 were moved to its closed position, thereby stopping the flow of fluid through the valve, the position of the O-rings 98 would be substantially as shown in FIGURE 2. The downstream portion of the line would be under reduced pressure conditions, thereby causing fluid trapped within the valve chamber 14 to tend to flow toward the downstream side of the valve, and causing the downstream O-ring 98 to move to its FIGURE 2 position. The upstream line, however, will be under line pressure and line pressure will be exerted through the clearance between the upstream seat assembly 74 and seat recess 70 and will be applied to the upstream O-ring 98, forcing it to its FIGURE 2 position.

With the valve under the pressure conditions illustrated in FIGURE 2, with the upstream and downstream O-rings 98 moved to their normal operating position, and assuming that the trapped fluid within the valve body expands due to heat, for example by ambient temperature rise or by heat from fire or other heat sources, the pressure generated by the expansion of the fluid will be applied equally to each of the O-rings 98. The downstream O-ring 98, being in its downstream position, will not be allowed to move, since it is supported by the downstream end wall of the annular chamber 96. As the body pressure becomes slightly higher than the pressure within the line, the upstream sealing member 98 will be moved in an upstream direction by the pressurized fluid, as illustrated in FIGURE 3. As the depression or depressions 100 are uncovered by the upstream O-ring 98, the seal between the surfaces 88 and 92 will be broken and fluid will be allowed to flow past the upstream O-ring 98, as illustrated by arrows in FIGURE 3. Since the increase in pressure within the valve chamber will tend to rise gradually as compared to changes in pressure within the line and since the volume of fluid flow required to reduce the body pressure is quite small, the excessive valve chamber pressure will be vented past the upstream O-ring into the upstream line. Movement of the upstream O-ring in an upstream direction will cease as soon as the excessive pressure has been vented and the O-ring will remain in this intermediate position until the pressures within the valve chamber and flow passages again become unbalanced. It is obvious that a mere reduction of upstream line pressure, such as would occur when the line is shut down, would cause venting of the valve chamber in the same manner as described above regarding excessive valve chamber pressure.

Assuming that the valve as illustrated in FIGURES 2 and 3 is reversed in the direction of fluid flow therethrough, the O-rings 98 will immediately be moved to the solid line position illustrated in FIGURE 4. The explanation of operation given above in regards to FIGURE 2 will merely be reversed with the pressurized fluid within the valve chamber forcing the downstream (left) O-ring 98 in a downstream direction past the depression structures 100 and into abutment with the downstream wall of the annular chamber 96. Here again a small amount of fluid will flow past the downstream sealing member 98 into the downstream line as the sealing member moves past the depression structure 100, however, the force applied to the downstream O-ring 98 by the pressurized fluid will be sufficiently great to force it past the depression structure 100, thereby reestablishing a fluidtight seal between the cylindrical surfaces 88 and 92. The upstream sealing member 98 (right) on a reversal of the direction of fluid flow, as illustrated in FIGURE 4, will be moved downstream past the depression structure 100 to sealing engagement with the downstream wall of the annular chamber 96.

Upon a subsequent increase in body pressure within the valve chamber 14 by expansion of the trapped fluid, as viewed in FIGURE 4, the upstream O-ring (right) will be moved by the expanding fluid within the valve chamber 14 to the position illustrated in dash lines in FIGURE 4, thereby breaking the seal and allowing the flow of fluid past the upstream O-ring 98 into the upstream line.

"Block and bleed" is a term referred to in the valve industry to indicate a test procedure whereby a valve may be tested to indicate leakage past either of the face sealing members or the back face sealing members. "Block and bleed" testing will generally be accomplished with the valve member 34 in its closed position and with the valve and valve chamber under pressure. The body bleed fitting 21 will be manually opened, thereby allowing the venting of fluid pressure from within the valve chamber 14 to the atmosphere. This, of course, establishes a pressure differential between the line and the valve chamber, and the line fluid under line pressure will enter the annular chambers 96, both upstream and downstream, thereby forcing each of the O-rings 98 toward the valve chamber 14 and establishing a fluidtight seal at the inner axial walls 90 of the seat assemblies 74 and 76. The face sealing members 78 will be forced tightly into sealing engagement with the spherical surface of the plug member 34 by the springs 84 and by pressure actuation of the seat assemblies. Since the seat assemblies have a larger back face area than face area in contact with the pressurized fluid, they will be actuated in a pistonlike manner to move into tight engagement with the plug member. If after the body bleed fitting 21 has been opened for a considerable length of time and fluid continues to flow out of the valve body through the fitting 21, this would indicate that either the O-rings 98 or the face sealing members 78 of the seat assembly structure have been damaged or have become worn to the extent that replacement is required. During "block and bleed" testing, as in the other forms of valve operation illustrated, the upstream O-ring will move swiftly downstream across the depression structure 100, allowing a small amount of fluid to bypass the sealing member 98, but the force applied to the sealing member 98 will be sufficiently great to force the O-ring sealing member 98 past the depression structure to reestablish the fluidtight seal between the body structure and seat assembly structure. The right or upstream portion of FIGURE 4 thus illustrates the configuration for both O-rings 98 under these pressure conditions.

As illustrated in dash lines in FIGURE 4, a modified embodiment of the invention is disclosed wherein the depression structure or body pressure relief structure is formed within the cylindrical wall 92 of the valve body 12. The operation of a valve construction in accordance with FIGURE 4 will operate in the same manner as discussed hereinabove in regard to FIGURES 2 and 3. As the back face O-ring 98 moves between the ends of the annular chamber 96 at a position intermediate the ends of the chamber 96, the O-ring 98 will be located over the depression structure 102, thereby breaking the seal between the cylindrical surfaces 88 and 92 and allowing the flow of fluid into the upstream line or downstream line, as discussed hereinabove. Depressions might also be formed both in the valve body wall and in the seat assembly wall if desired and the arrangement, number and size of the depressions 100 will depend upon the design characteristics of the valve, such as size of the valve body, operating pressure, type of fluid to be controlled, etc.

It is evident, therefore, that I have produced a novel seat assembly construction for valves which will effectively vent gradually increasing pressure within the valve chamber of the valve to the upstream line, thereby eliminating the possibility of rupturing the valve body or damaging the valve body by excessive body pressure. It is also apparent that I have produced a novel assembly construction for valves which effectively allows reversible operation of the valve in addition to venting excessive body pressure. A valve constructed in accordance with the present invention effectively allows the maintenance of a fluidtight seal between the seat assembly and the valve member at all times and is adapted for block and bleed testing to determine the sealing ability of the face sealing members and the back face sealing members without dismantling the valve. It is also apparent, therefore, that I have produced a novel seat assembly construction for valves, allowing the production of inexpensive and reliable valve constructions. It is evident, therefore, that this invention is one well adapted to attain all of the objects hereinabove set forth, together with other advantages which are obvious and inherent from the description of the apparatus itself.

It will be understood that certain features and subcombinations are of utility and may be employed without reference to other features and subcombinations.

This is contemplated by and is within the scope of the claims. As many possible embodiments may be made of this invention without departing from the spirit or scope thereof, it is to be understood that all matters hereinabove set forth or as shown in the accompanying drawings are to be interpreted as illustrative and not in a limiting sense.

I claim:
1. A valve comprising a valve body having a valve chamber therein and upstream and downstream flow passages in communication with the valve chamber, a valve member disposed within the valve chamber and movable between open and closed positions to control the flow of fluid through said passages, means for imparting movement to said valve member, seat recesses formed in the valve body on opposite sides of the valve member, said seat recesses defining substantially cylindrical walls, seat assemblies disposed within the seat recesses and having a portion thereof in sealing engagement with said valve member, said seat assemblies cooperating with said substantially cylindrical walls to define annular chambers having smooth and unobstructed cylindrical walls, a movable sealing member disposed in each of said annular chambers and establishing a seal between the seat assemblies and the substantially cylindrical surfaces in the body, at least one pressure venting depression formed in at least one of said cylindrical walls and cooperating with said movable sealing member to vent pressure within the valve chamber to the upstream flow passage in the event that fluid pressure within said valve chamber becomes higher than the upstream line pressure.

2. A valve comprising a valve body having a valve chamber therein and upstream and downstream flow passages in communication with the valve chamber, a valve member disposed within the valve chamber and movable between open and closed positions to control the flow of fluid through said passages, means for imparting movement to said valve member, seat recesses formed in the valve body on opposite sides of the valve member and defining substantially cylindrical walls, seat assemblies disposed within the seat recesses and having a portion thereof in sealing engagement with said valve member, said seat assemblies cooperating with said substantially cylindrical walls to define annular chambers having smooth and unobstructed cylindrical walls, a movable sealing member disposed in each of said annular chambers and establishing a seal between the seat assemblies and the valve body, at least one pressure venting depression formed in at least one of said cylindrical walls and cooperating with said movable sealing member to break said seal and vent gradually increasing pressure within the valve chamber to the upstream flow passage, at least one of said sealing members being movable responsive to a sudden increase in pressure within said valve chamber to a position preventing venting of said valve chamber.

3. A valve comprising a valve body having a valve chamber therein and upstream and downstream flow passages in communication with the valve chamber, a valve member disposed within the valve chamber and movable between open and closed positions to control the flow of fluid through said passages, means for imparting movement to said valve member, seat recesses formed in the valve body on opposite sides of the valve member and defining substantially cylindrical walls, seat assemblies disposed within the seat recesses and having a portion thereof in sealing engagement with said valve member, each of said seat assemblies interfitting with the valve body to define an annular chamber between the seat assembly and the substantially cylindrical wall of the respective seat recess, said annular chamber having smooth and unobstructed cylindrical walls, a resilient sealing member positioned within the annular chamber and establishing a seal between the seat assemblies and the substantially cylindrical wall of the seat recess in the valve body, at least one of the cylindrical walls of said annular chamber having at least one pressure venting depression formed therein and being disposed intermediate the axial ends of said annular chambers, said sealing member cooperating with said depression to vent gradually increasing pressure within the valve chamber to the upstream flow passage, said sealing member being movable to a position preventing the venting of the body pressure in response to sudden increases in body pressure.

4. A valve comprising a valve body having a valve chamber therein and upstream and downstream flow passages in communication with the valve chamber, a valve member disposed within the valve chamber and movable between open and closed positions to control the flow of fluid through said passages, means for imparting movement to said valve member, seat recesses formed in the valve body on opposite sides of the valve member, seat assemblies disposed within the seat recesses and having a portion thereof in sealing engagement with said valve member, each of said seat assemblies interfitting with the valve body to define an annular chamber therebetween having inner and outer smooth and unobstructed cylindrical peripheral walls, a resilient sealing member disposed within each of the annular chambers and establishing a seal between said substantially cylindrical peripheral walls of the seat assemblies and the valve body, at least one depression formed in one of said cylindrical walls and being disposed intermediate the axial ends of the annular chamber, the upstream and downstream sealing members being movable by line pressure to the downstream end of the annular chamber to maintain a fluidtight seal between the valve body and seat assemblies, the upstream one of the sealing members being movable upstream by body pressure into juxtaposed relation with said vent means whereby said body pressure will be vented into the upstream flow passage in the event said body pressure exceeds upstream line pressure.

5. A valve as set forth in claim 4; said vent means being formed in said seat assembly.

6. A valve as set forth in claim 4, said vent means being formed in said valve body.

7. In a valve having a valve body having a valve chamber therein and upstream and downstream flow passages in communication with the valve chamber the improvement comprising; seat recesses formed within the valve body, seat assemblies movably disposed within the seat recesses and cooperating with the valve body to define annular chambers about the outer periphery of said seat assemblies, said annular chambers having greater axial lengths than annular dimension and having substantially smooth and unobstructed cylindrical walls, an O-ring type resilient sealing member disposed within each of the annular chambers and being of slightly greater cross-sectional diameter than the annular dimension of the respective annular chamber and establishing a fluidtight seal between the seat assemblies and the valve body, at least one pressure venting depression formed in at least one of said cylindrical walls and being disposed intermediate the ends of the annular chamber, the upstream and downstream sealing members adapted for axial movement by the pressurized fluid to a position downstream of said depression to establish a fluidtight seal between the body and the upstream seat assembly, said upstream sealing member adapted upon a substantially gradual increase in the pressure of the fluid within the valve body for movement into juxtaposed relation with said depression whereby said gradually increasing pressure may be vented past the upstream sealing member into the upstream flow passage.

8. In a valve having a valve body having a valve chamber therein and upstream and downstream flow passages in communication with the valve chamber the improvement comprising; seat recesses having at least one substantially smooth and unobstructed cylindrical surface, formed within the valve body, seat assemblies movably disposed within the seat recesses and cooperating with the valve body to define annular chambers about the outer peripheries of said seat assemblies, said annular chambers having greater axial lengths than annular dimension and having substantially smooth and unobstructed cylindrical walls, an O-ring type resilient sealing member disposed within each of the annular chambers and being of slightly greater cross-sectional diameter than the annular dimension of the respective annular chamber and establishing a fluidtight seal between the seat assemblies and the valve body, at least one pressure venting depression formed in each of the cylindrical seat recess surfaces thereby disposing said venting depression intermediate the ends of the annular chamber, the upstream and downstream sealing members adapted for axial movement by the pressurized fluid to a position downstream of said depression to establish a fluidtight seal between the body and the upstream seat assembly, said upstream sealing member adapted upon a substantially gradual increase in the pressure of the fluid within the valve body for movement into juxtaposed relation with said depression whereby said gradually increasing pressure may be vented past the sealing member through said venting depression and into the upstream flow passages.

9. In a valve having a valve body having a valve chamber therein and upstream and downstream flow passages in communication with the valve chamber, the improvement comprising; seat recesses formed within the valve body and having at least one smooth and unobstructed cylindrical surface, seat assemblies movably having at least one smooth and unobstructed cylindrical surface disposed within the seat recesses and cooperating with the valve body to define annular chambers about the outer peripheries of said seat assemblies, said annular chambers having greater axial lengths than annular dimension and having smooth and unobstructed cylindrical walls, an O-ring type resilient sealing member disposed within each of the annular chambers and being of slightly greater cross-sectional diameter than the annular dimension of the respective annular chamber and establishing a fluidtight seal between the seat assemblies and the valve body, pressure venting depression means formed in said cylindrical surfaces of the seat assemblies and in said cylindrical surfaces of the seat recesses and being disposed intermediate the ends of the respective annular chamber, the upstream and downstream sealing members adapted for axial movement by the pressurized fluid to a first position downstream of said depression means to establish a fluidtight seal between the body and the upstream seat assembly, said upstream sealing member adapted upon a substantially gradual increase in the pressure of the fluid within the valve body for movement to a second juxtaposed position with said depression means whereby said gradually increasing pressure may be vented past the sealing member into the upstream flow passage, said sealing members adapted upon a reverse in the direction of fluid flow to move to a third position within the annular chamber to establish a fluidtight seal between the seat assembly and the valve body.

References Cited

UNITED STATES PATENTS

| 2,614,793 | 10/1952 | Storm | 137—525 |
| 3,122,352 | 2/1964 | Anderson et al. | 137—525 X |
| 3,173,647 | 3/1965 | Bryant | 251—172 |

WILLIAM F. O'DEA, *Primary Examiner.*

D. LAMBERT, *Assistant Examiner.*